Aug. 13, 1940.  P. W. SODERBERG  2,211,733
PROCESS OF PRODUCING ALKALI SILICATES
Filed March 18, 1938  2 Sheets-Sheet 2
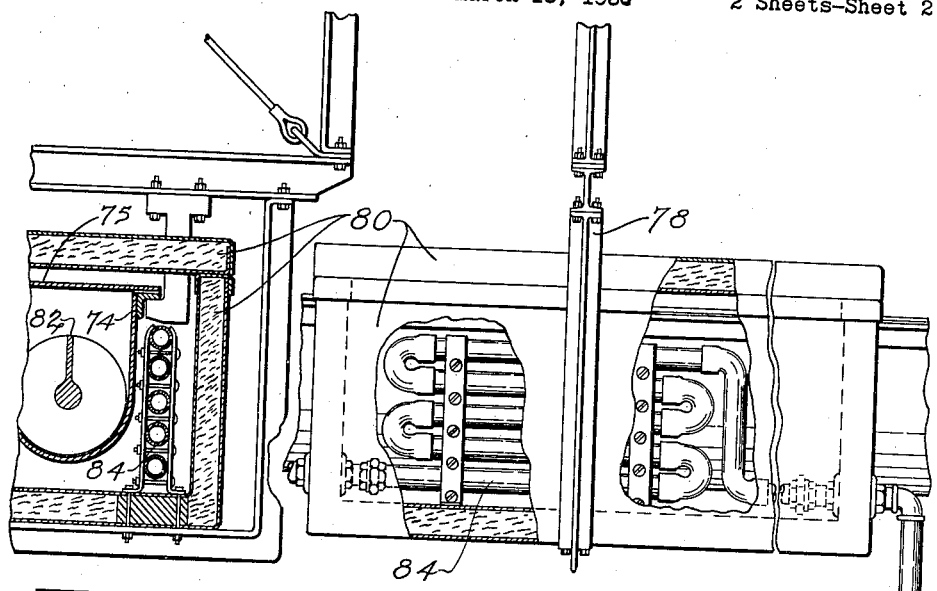
Fig. 3
Fig. 4
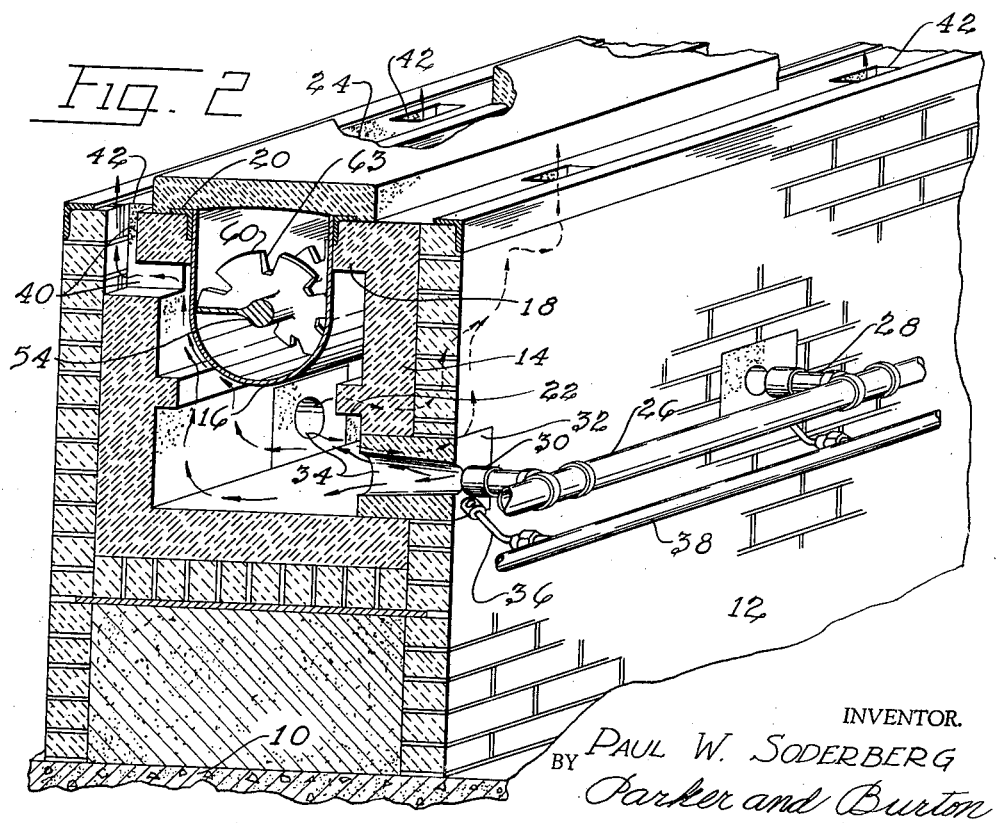
Fig. 2
INVENTOR.
BY PAUL W. SODERBERG
Parker and Burton
ATTORNEY.

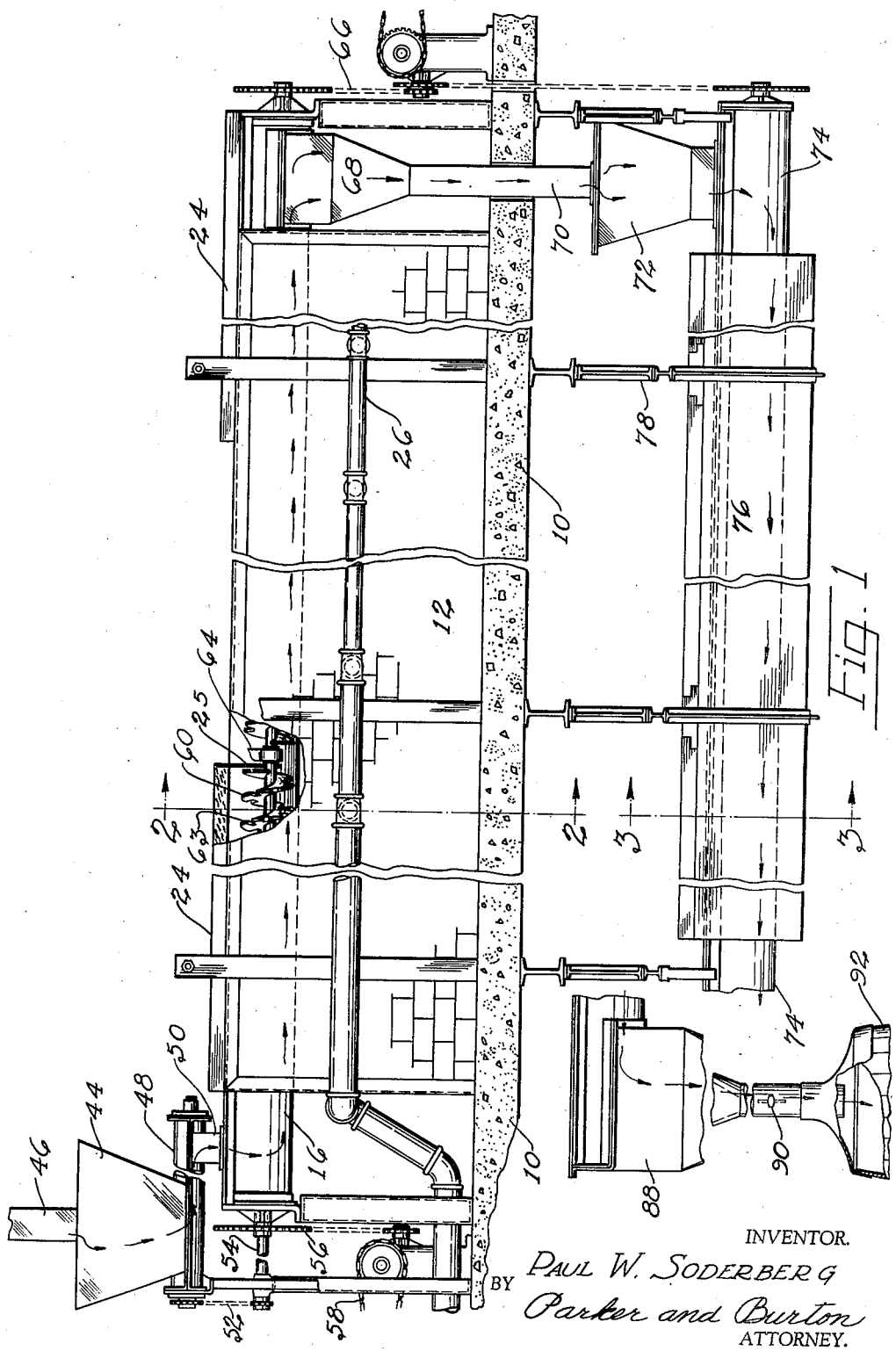
Aug. 13, 1940. P. W. SODERBERG 2,211,733
PROCESS OF PRODUCING ALKALI SILICATES
Filed March 18, 1938   2 Sheets-Sheet 1
INVENTOR.
PAUL W. SODERBERG
BY Parker and Burton
ATTORNEY.

Patented Aug. 13, 1940

2,211,733

UNITED STATES PATENT OFFICE 2,211,733

PROCESS OF PRODUCING ALKALI SILICATES

Paul W. Soderberg, Wyandotte, Mich., assignor to The J. B. Ford Company, Wyandotte, Mich., a corporation of Michigan Application March 18, 1938, Serial No. 196,713

4 Claims. (Cl. 23—110)

My invention relates to an improved process of making dry granular alkali silicates by chemical reaction resulting from heat.

An object is to provide such a process and apparatus whereby dry comminuted alkali silicates may be produced by chemical reaction resulting from heat rapidly, economically, and as a continuous operation. An important characteristic of the alkali silicates resulting from this process is that they are of exceptionally high purity and, if desired, they may be produced in an anhydrous state.

This process does not include water dissolution of the alkali ingredient of the mixture nor the employment of heat sufficiently high to melt the same. It contemplates rather the production of the alkali silicate from relatively dry silica and some suitable relatively dry solid commercial form of $Na_2O$ such as caustic alkali or caustic soda by direct reaction caused by heat at a temperature preferably below the melting point of the caustic alkali but carried out as a continuous process in such a manner that the resulting product is of an exceptionally high purity and uniformity.

For many years prior to the development of the process herein set forth it has been the commercial practice of the assignee of this invention to manufacture alkali silicates, such as orthosilicate and other alkali detergent compounds including alkali silicates, by direct chemical reaction of the caustic alkali and finely divided silica caused by heat, at temperatures below the melting point of caustic soda and without prior dissolution of the alkali, according to what might be termed dry "batch" processes as compared with the continuous dry stream process of the present invention. The alkali silicates resulting from these prior practices did not, however, possess the uniformity and high purity which characterizes the product of the present invention.

Such prior practices comprised mixing in a heated kettle at a temperature in the neighborhood of 175° C. approximately 25-30% of silica with alkali materials constituting the remainder up to 100% and including 35-75% $Na_2O$ in the form of caustic alkali. The proportions and ingredients would vary in detail according to the particular end product sought but were within the limits above set forth. The chemical reaction started within a very short time after all ingredients had been placed in the kettle and quickly reached a violent stage with a substantial increase in temperature and the mixture progressed through the form of a pasty plastic mass into a granular flowable mass. It was common practice to accompany the heating with stirring of the mixture. Within approximately ten minutes from the time of mixing the silica and caustic alkali in the kettle, the alkali silicate reaction product could be dumped as a dry granular flowable finished product. For commercial use this reaction product might thereafter be screened and marketed without further change or it might be mixed with other materials to form desired detergent compounds. It was not customary to further dry the same before shipment though such drying was employed if a strictly anhydrous product was desired.

The silica used was commonly in the form of volcanic ash. Generally, the alkali materials were put in the kettle in solid form though it was customary to put in a small amount of hydrated caustic in the form of concentrated caustic liquor. The amount of water entering the mixture in the hydrated caustic might vary from 6 to 23% of the total mix. The melting point of anhydrous caustic soda is in the neighborhood of 318° C. It is well known that when water is absorbed by or mixed with caustic soda that the melting point is lowered according to the amount of water added. It should be understood that when speaking of the melting point of caustic soda it is the melting point of anhydrous caustic soda which is referred to and not the melting point of any hydrates thereof. Commercial caustic of 70% NaOH and 30% water is solid at ordinary temperatures but liquid at 150° C. Whether or not sufficient water was added to cause the caustic to liquefy at the temperatures employed was of little consequence in the finished product so long as the amount of water used was not sufficient to keep the caustic in liquid form at room temperatures. The addition of water, however, facilitated the rate of heat transfer through the mass by making a more intimate mixture and thereby speeded up the operation.

The present process contemplates the production of alkali silicates, such as orthosilicate which has heretofore been produced as above described, by a continuous process whereby a mixture stream of alkali and silica is constantly mixed and advanced at a uniform rate through a reaction chamber and subjected throughout such advance to heat. The alkali and silica are mixed together as hereinabove set forth or as anhydrous materials. Upon entering the reaction chamber they are advanced continuously therethrough, the reaction being completed therein and the materials discharged therefrom as dry granular alkali silicate.

My arrangement is such that preceding the development of the active chemical reaction the mixture is advanced and mixed free from exposure to the atmosphere and is therefore prevented from taking up carbon dioxide. During the active chemical reaction stage the mixture stream discharges vapor products of reaction into the air. Carbon dioxide or other foul material in the air will not be picked up by the exposed mixture stream during the active chemical reaction stage due to the active flow of heat and vapor away from the mixture.

When the alkali silicate leaves the reaction chamber it is in the form of a granular flowable mass. It may be an entirely anhydrous product or it may contain some water of crystallization. Its particular character, its purity, and its uniformity may be accurately and easily controlled with my improved process.

Other objects, advantages, and meritorious features of this improved process and apparatus whereby the process is carried out will more fully appear from the following specification, appended claims, and accompanying drawings, wherein:

Figure 1 illustrates one form of apparatus particularly adapted for the accomplishment of the objects of this invention, Fig. 2 is a perspective and vertical cross-section taken on the line 2—2 of Fig. 1, Fig. 3 is a vertical cross-sectional view partly broken away taken on line 3—3 of Fig. 1, and Fig. 4 is a side elevation partly broken away of a fragment of the construction shown in the lower half of Fig. 1.

The apparatus illustrated is one which has been found particularly suitable for the accomplishment of this invention and comprises a longitudinal reaction chamber through which the materials to be reacted are advanced as a continuously moving stream. The apparatus is described and claimed in my copending application Serial No. 213,285, filed June 11, 1938. The ingredients which go to make up the reaction product are admitted into one end of the chamber and moved therethrough for discharge from the opposite end. The advance of these materials is accompanied by continual stirring or mixing thereof and is also accompanied by heat to which the materials are subjected throughout their advance. The rate of advance and the temperature to which the materials are heated depend upon the character of the ingredients and the desired dryness of the end product. The reaction chamber is of sufficient length so that consistent with the heat applied and rate of mixture advance the chemical reaction occurs at an intermediate portion of the length of the chamber.

In the manufacture of alkali silicate and particularly orthosilicate which is a reaction product that has been found particularly suitable for production in the apparatus here shown the reaction occurs at an intermediate portion of the length of the chamber and in the structure illustrated at that portion which is shown as being uncovered. The reaction chamber comprises a tunnel or trough like structure through which the ingredients of the mixture are impelled by a suitable conveyor which also operates to mix the materials together simultaneously with their advance. Associated with this reaction chamber is a combustion chamber arranged lengthwise thereunderneath and adapted to heat the bottom and side walls of the reaction chamber.

In Figs. 1 and 2 there is shown a supporting floor 10. Mounted on the floor is an enclosure indicated generally by the numeral 12 which enclosure may be formed of brick or other suitable refractory material. The enclosure is here illustrated as being of substantial length and as generally of a rectangular shape in cross section. The construction more clearly appears in the view of Fig. 2. In this figure it will be noted that the upper portion between the brick walls is lined with a suitable refractory liner 14 which supports a trough shaped element formed of metal indicated as 16. The liner is provided along its upper edges with an overhanging ledge 18 which supports the trough 16 through the employment of angle iron strips 20 secured to opposite sides of the trough.

This liner is also provided with longitudinally extending ribs 22 so spaced with respect to the bottom of the trough 16 as to direct the flames produced in the combustion chamber below the trough closely along the side walls of the trough. It will be noted that the side walls of the trough structure 16 are spaced from the liner 14 so as to provide what might be termed a trough with hollow side walls. The space below the trough forms a combustion chamber and the bottom of the trough is exposed thereto. The trough may be provided with a refractory cover element 24. The trough might be said to constitute a tunnel-like reaction chamber.

Along each side of the brick work there extends a fuel mixture manifold pipe 26 which leads from a suitable source of supply, such as a mixture of gas and air. This manifold pipe is provided with a plurality of spaced feed pipes 28. Each feed pipe has a discharge nozzle 30 disposed opposite a flame directing element 32 formed of suitable refractory material and having a flaring passageway 34 extending therethrough to discharge the fuel mixture into the combustion chamber underneath the trough. A pilot 36 leading from a feed pipe 38 is associated with each burner pipe 28 as shown in Fig. 2.

It will be seen that the blast of burning gas directed through the aperture 34 travels across the combustion chamber underneath the bottom of the trough 16 and passes upwardly along the opposite side wall of the trough and out through a discharge passageway 40 through the opposite side wall of the liner or what might be termed an outlet from the hollow side wall of the trough. The actual outlet to the atmosphere is at 42 as illustrated in Fig. 2.

It will be noted that the ribs 22 of the liner serve to cause the products of combustion to hug closely to the side walls of the trough and that each burner pipe is disposed opposite an outlet for products of combustion on the opposite side of the combustion chamber. It will also be noted that the outlets for the products of combustion and consequently the burner pipes are staggered upon one side of the chamber as compared with the other.

In Fig. 1 it will be noted that the metal trough 16 extends beyond each end of the brick work which encloses the combustion chamber. At the forward end there is arranged a hopper 44 into which the ingredients that go to make up the mixture may be discharged through a pipe 46. At the discharge end there is a hopper 68 into which the trough discharges as hereinafter described.

The hopper has an outlet 48 within which is positioned a conveyor such as a rotatable screw conveyor that feeds the material from the hopper into a vertical discharge pipe 50 from where it discharges into the end of the trough 16. This screw conveyor is of any suitable conventional type and may be driven through a chain drive 52 which is in turn connected up with a shaft 54 which is provided with drive mechanism 56 that in turn is coupled with other driving mechanism 58 that may lead to an electric motor or any other source of suitable power in a manner which is well understood. The shaft 54 extends into and lengthwise through trough 16. It carries an impelling screw 60 which is cut away at intervals so that it will mix the material being advanced by it. There may be three cut outs in each flight of the screw. These are shown in Figs. 1 and 2 and indicated as 63.

The mixing advancing screw may be formed in sections as is shown in Fig. 1 where the forward section is driven from the mechanism heretofore described and terminates at a bearing 64 intermediate the length of the trough and the after section is driven from suitable drive mechanism indicated generally as 66 which may be driven from any suitable source of power not shown. Due to the fact that the reaction chamber is of substantial length it is preferable to separate the screw into two sections so as to get a drive on each end. Furthermore, the rate of advance may be varied as between the two sections as is found desirable.

In the structure illustrated in Fig. 1 the after end of the reaction chamber is provided with a cover plate 24 and in such figure of the drawings there is shown a cooling chamber disposed suspended underneath the floor 10 below the reaction chamber and into which the reaction product from the reaction chamber is discharged and advanced for cooling.

The trough 16 discharges at its after end into a hopper 68 which in turn discharges through an outlet 70 into a hopper 72 that feeds into a trough like structure 74 which extends through the enclosure 76 of the cooling chamber which is supported by brackets 78 below the floor 10. A cross section of this enclosure is shown in Fig. 3 and a broken away portion in Fig. 4. The enclosure has bottom and side walls indicated as 80 and a top wall identified by the same numeral. An interrupted screw impeller 82 similar to the screw impeller 54 extends through the trough 74. The trough 74 may be provided with a cover 75 as shown in Fig. 3.

The wall of the enclosure is an insulated wall and fluid cooling pipes 84 are arranged within the enclosure on opposite sides of the trough and convey cooling fluid from any suitable source of supply so as to produce a circulating cooling medium about the trough whereby the mixture may be rapidly cooled so as to be packaged for commercial distribution directly upon discharge from the apparatus.

The trough 74 is shown in Fig. 1 as broken away at the discharge end and this broken away portion is shown as discharging into a hopper 88 which feeds through an outlet 90 into any suitable container such as barrel 92. It is apparent that if it were desired the cooling section need not be used and the hopper 68 might discharge directly into a receptacle wherein the reaction product might be carried away and stored to be later packaged for shipment. It will be noted that the cover plate 24 at the forward end of the reaction chamber is provided with a flap valve element 25 which bears on the mixture stream and said portion of the mixture stream is thereby shut off from exposure to the atmosphere. The after cover plate 24 may be provided with a similar flap valve.

In carrying out my invention materials which go to make up the ultimate reaction product are discharged through the pipe 46 into the hopper 44 and fed by means of the screw conveyor through the pipes 48 and 50 into the trough 16.

They are advanced through this trough by the screw 60 which screw because of the cut outs exerts a constant mixing action on the materials throwing them outwardly toward the wall of the trough and stirring them continually as they pass along the length of the trough. The rate of advance may be accurately regulated by regulating the rotation of the screw through a suitable control providing for its rotation which may be of any conventional kind. In one apparatus which has been found suitable the reaction chamber has a length of approximately fifty feet and the product may be passed therethrough in twenty or thirty minutes. The rate of advance through the reaction chamber can, of course, be used to control the relative amount of moisture of crystallization permitted to remain in the reaction product and in combination with the amount of heat to which the chamber is subjected will control the time at which the active chemical reaction will occur.

In the manufacture of orthosilicate one formula involves the use of 25–30% $SiO_2$; in the form of finely divided silicate flour of particularly high purity and the admixture therewith of 75–70% respectively, of powdered caustic soda. This mixture when it reaches the temperature of approximately 175° C. which is substantially below the melting point of caustic soda results in a violent chemical reaction and the apparatus is so constructed and operated that this reaction will occur within the intermediate uncovered portion and the vapor products of reaction will be discharged into the atmosphere. If desired a hood might be provided over this uncovered portion discharging at a remote point into the atmosphere. During this chemical reaction the mixture goes through the state of a pasty plastic mass into the form of a granular substance which, with the constant mixing of its continuing advance through the after portion of the chamber, ultimately takes the form of a relatively finely divided product which is flowable as a relatively dry granular orthosilicate. By controlling certain variables such as the temperature and the rate of advance of the material through the closed and open portions, the moisture content of the final product may be accurately controlled.

The chemical reaction is an exothermous one and the temperature is raised above 175° C.

It will be noted that the reaction occurs within an intermediate portion of the reaction chamber. As the mixture continues through the after portion of the chamber the heat is continued and the heat is such that the mixture attains a temperature greater than that accompanying the chemical reaction and approximating 250° to 300° C.

If an anhydrous product is to be produced this temperature in the after portion of the chamber is necessary because of the strong affinity of the alkali and the alkil silicate for water. The greater the percentage of water in the original mixture the more necessary this application of heat in the after portion of the reaction chamber becomes to bring the product to the anhydrous state. Whether water is used in the original mix or not the water formed by the reaction makes it necessary to continue the heating of the mixture following such reaction in order to produce an anhydrous product.

The heat can be controlled so as to give a finished product which is anhydrous or one which contains any desired amount of moisture. In the apparatus shown the mixture is subjected to a substantially constant temperature throughout the length of the reaction chamber but the temperature of the mixture does not attain its maximum until some time after it has passed through the active chemical reaction shown. In the after portion of the chamber it may attain a temperature of approximately 300° C.

It has been found that by covering the forward portion of the reaction chamber the material is prevented from absorbing carbon dioxide from the atmosphere and a product of exceptionally high purity results. Carbon dioxide will not be taken up through the uncovered portion because of the violent chemical reaction going on and the discharge of vapor products at high temperature therefrom. It is believed desirable that the after portion of the reaction chamber also be covered and this is here shown.

If it is desired to cool the product for immediate packaging the operation may be continued through the cooling chamber portion underneath the floor, the operation of which has hereinabove been described.

In addition to orthosilicate it is of course possible to produce many other reaction products in the apparatus shown. For example the apparatus may be used to produce pyrophosphate out of disodium phosphate. Various other alkali silica mixtures may be produced in a similar manner. One mixture found suitable involves the use of silica, powdered caustic and trisodium phosphate. To produce the different reaction products the speed of advance and rate of feed and heat will be regulated as found necessary. The mixture of materials entering the reaction chamber may also include a certain proportion of hydrated caustic in the mix if such is found desirable. Reference has been made to such a mixture hereinbefore.

What I claim:

1. That process of producing an alkali metal silicate comprising mixing silica with not less than the same amount of caustic alkali, advancing said mixture in a continuous moving stream, subjecting said mixture during its advancement to a mixing operation and to heat, regulating the rate of advancement of the stream and the temperature of the heat applied so that the active chemical reaction of the mixture occurs in an intermediate portion of the length of the moving stream, enclosing that portion of the moving stream preceding the active chemical reaction zone and that portion following such active chemical reaction zone to thereby protect said portions of the stream from direct communication with or direct exposure to the atmosphere, venting to atmosphere the intermediate portion of the stream in which the active chemical reaction takes place to permit the exhaust of water vapor arising therefrom, and providing a small amount of moisture in that enclosed portion following the active chemical reaction zone.

2. That process of producing a granular form of alkali metal silicate comprising mixing silica with not less than the same amount of caustic alkali, advancing said mixture as a continuous stream and subjecting it during its advancement to a mixing operation and to heat sufficient to produce an active chemical reaction of the mixture at an intermediate section of the length of the stream, closing off the sections of the stream preceding and following said intermediate section from contact with the atmosphere while venting the middle section to the atmosphere for the escape of water vapor arising from the chemical reaction, and so regulating the rate of advance of the stream and the heat applied that a small amount of the moisture is caused to remain with the stream in order to provide a product having a granular character.

3. That process of producing a granular form of an alkali metal silicate which comprises mixing silica with not less than the same amount of caustic alkali, advancing said mixture in a continuously moving stream, subjecting said mixture during substantially the entire length of its advancement to a mixing operation and to heat, protecting the forward and rear sections of the stream from contact with the air, and regulating the rate of advancement of the stream and the heat applied so that the major portion of the active chemical reaction for forming the alkali silicate occurs in the intermediate section between said protected end sections and so that a small portion of the reaction is carried over into the protected rear end section of the stream where water vapor arising therefrom is prevented from escaping but instead is incorporated into the final product.

4. That process of producing a granular form of an alkali metal silicate which comprises mixing silica with not less than the same amount of caustic alkali, advancing said mixture in a continuously moving stream, subjecting said mixture during its advancement to a mixing operation and to heat, regulating the rate of advancement of the stream and the temperature of the heat applied so that the active chemical reaction of the mixture occurs in an intermediate section of the length of the moving stream, enclosing sections of the stream on opposite sides of said intermediate section to thereby protect said sections of the stream from direct contact with the atmosphere, venting to atmosphere said intermediate section of the stream in which the active chemical reaction takes place in order to exhaust the water vapor arising therefrom, and causing some moisture to be retained in the stream after it leaves said intermediate vented section in order to provide moisture in the final product.

PAUL W. SODERBERG.